March 25, 1947.　　F. G. COSTELLO　　2,417,914

VARIABLE SPEED TRANSMISSION DEVICE

Filed April 3, 1944

Inventor
Francis G. Costello

By Lyon & Lyon
Attorneys

Patented Mar. 25, 1947

2,417,914

UNITED STATES PATENT OFFICE 2,417,914

VARIABLE-SPEED TRANSMISSION DEVICE

Francis G. Costello, Los Angeles, Calif.

Application April 3, 1944, Serial No. 529,346

8 Claims. (Cl. 74—230.17)

This invention relates to variable speed transmission devices and more particularly to a V-belt and pulley type of transmission including pulleys of variable effective diameter.

It is an object of this invention to provide a belt and pulley type variable transmission which includes a variable diameter pulley having a movable pulley face formed of sections of variable diameter and including locking pin construction for releasably locking the sections together in their required relationship.

Another object of this invention is to provide a variable speed pulley and belt transmission capable of wide variation through effective diameter of the transmission elements and incorporating therein a locking pin mechanism applicable to retain the sections of the locking pulley in their required position.

Other objects and advantages of this invention it is believed will be apparent from the following detailed description of a preferred embodiment thereof as illustrated in the accompanying drawings.

Figure 1:
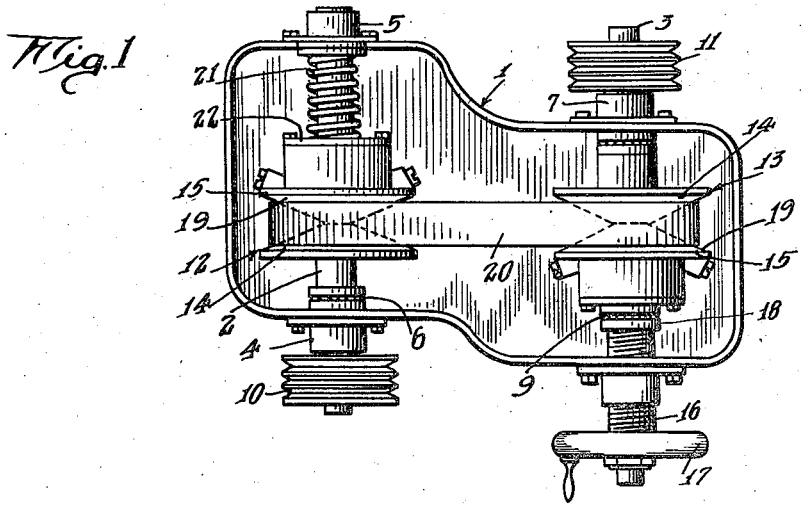
Figure 1 is a top plan view of the variable speed pulley and belt transmission with the upper portion of the housing case removed.

In the preferred embodiment of my invention as illustrated in the drawings, I indicates a case in which there is journaled a driven shaft 2 and a driving shaft 3. The shaft 2 is suitably journaled in the case. Bearings 4 and 5 are provided with a suitable end thrust bearing 6 to compensate for the end thrust of the pulley transverse of the case 1. The shaft 3 is suitably journaled in the case 1 on bearings 7 and 9. The bearing 9 likewise provides an end thrust bearing. The shaft 2 may be driven from any suitable or desirable source of power as, for example, by the passing of suitable V belts over the V belt pulley 10 secured thereto exterior of the case 1. The shaft 3 is provided with a take-off drive pulley 11 for driving any suitable or desirable mechanism.

Mounted upon the shafts 2 and 3 are variable diameter belt pulleys 12 and 13 which are of like construction so that the specific details of only one of these pulleys need be described. The pulleys 12 and 13 include fixed face elements 14 and variable face elements 15. The variable face element 15 on the shaft 3 is adapted to be moved longitudinally of the shaft through the medium of a threaded sleeve 16 which is secured to a hand wheel 17 which is journaled on the shaft 3. The inner end of this sleeve engages the thrust plate 18 of the thrust bearing 9 so that as the hand wheel 17 is turned upon the shaft 3, the position of the thrust plate 18 is varied longitudinally of the shaft permitting the movable face plate 15 to move toward or away from the fixed plate 14 in accordance with the thrust imposed upon the tapering face 19 thereof by the V-belt 20.

On the driven shaft 2 the movable face plate 15 is moved toward the fixed face plate 14 by means of a spring 21 which engages the collar plate 22 at one end.

Each of the V-belt pulleys 12 and 13 are of like construction and are reversed in their positions upon the shafts 2 and 3. In each of these pulleys movable flange faces 15 are made up of an inner cone section 23 and an outer cone section 24 which are adapted to be held in position of face alignment through the medium of a locking means 25. The locking means 25 is of such a construction as to maintain the cone sections 23 and 24 in face alignment except under the spreading pressure exerted thereagainst by means of the V-belt 20 tending to rise out of the V formed between the fixed and movable plates 14 and 15 or tending to travel toward the axis of the supporting shaft. The locking means 25 is therefore operated in accordance with the thrust imposed upon the face of the movable element 15.

The inner cone section 23 is movable within the supporting housing 26 relative to the outer cone section 24 and is urged into face alignment therewith by means of a spring 27 mounted within the housing 26 to engage the face plate 22 at one end and to engage within a recess 28 formed at the rear of the cone section 23. The members 14 and 15 are suitably secured to their respective shafts as, for example, by means of a key 29 which extends longitudinally of the shaft and through the movable cone section 23 so that this section 23 is splined to the shaft to move longitudinally therealong.

The locking means 25 as herein illustrated in its preferred form includes a locking pin 30 which is mounted to move longitudinally of its length within an inclined bore 31 formed in the cone section 23 and to extend into a shallow and tapering cam recess 32 formed either in the supporting shaft or in the spline 29 as illustrated. There is likewise formed in the cone section 24 an aligning bore 33 which is in axial alignment with the bore 31 when the cone sections 23 and 24 are moved to position to present a straight tapered inclined belt bearing surface.

Mounted in the bore 33 is a pin 34 having a limiting flange 35 at its outer end which is adapted to be stopped against the shoulder 36 formed at the enlargement of the bore 33. The inner end of the pin 34 is rounded to provide a cam surface as indicated at 37. Likewise the pin 30 is rounded at its inner end to provide a cam surface 38. The pin 34 is yieldably urged downward in the bore 33 through the medium of a spring 39 mounted within the enlargement of the bore 33 and adjustably retained in position by means of a cap 40 threaded within this bore enlargement. As illustrated there are two locking means 25 which are diametrically opposed and are carried by the movable flange 15 of the pulley assembly.

The operation of the V-belt pulley transmission embodying my invention is: The shaft 3 or the shaft 2 may be the driven shaft, as desired. In either case the shaft may be driven by its corresponding V-belt pulleys 10 or 11. As illustrated the pulley assembly 12 and 13 are of equal diameter. However, it is obvious that any desired range of diameter may be employed dependent upon the gear reduction or transmission speed ratio desired. In the case where the pulley 10 is the driven pulley, the belt 20 will act to drive the V-belt pulley 13 from the V-belt pulley 12 dependent upon the desired setting of the movable pulley face 15 with respect to the fixed pulley face 14. This adjustment is accomplished through the medium of the handwheel 17 and threading of the sleeve operatively associated therewith to move the bearing plate in or along the shaft 3. As soon as a selected position is determined, the driving pulley 15 automatically accommodates itself to the gear ratio selected.

Figure 2:
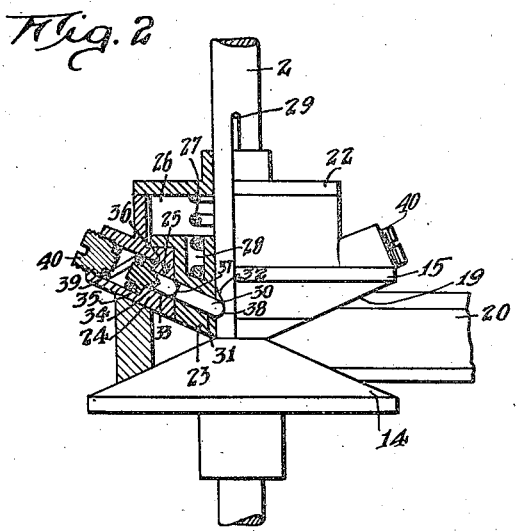
Figure 2 is a fragmental elevation partly in section of one of the variable diameter pulleys embodied in my invention illustrating the pulleys section in face alignment and with the movable pulley face moved to a position of intermediate effective diameter.
Figure 3:
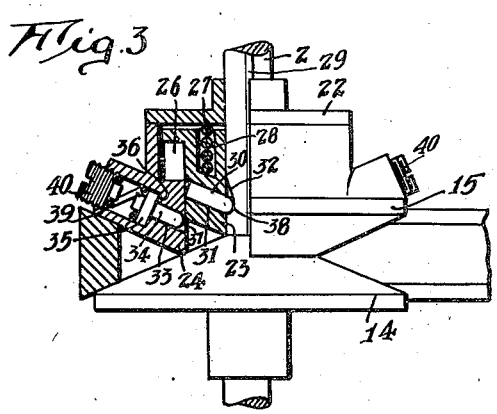
Figure 3 is a view similar to Figure 2 with the upper portion of the movable pulley face moved to a position of maximum effective diameter.

As illustrated in Figure 2, a gear ratio has been selected such that the V-belt 20 rides at the base of the cone section 24 and in this position cone sections 23 and 24 are in face alignment. As the handwheel 17 is turned to increase the effective diameter of the pulley 14, the effective diameter of the pulley 12 automatically accommodates itself to this change. Therefore the outer cone section 24 is thrust toward the fixed pulley flange 14 as illustrated in Figure 3 to a position where the belt 20 rides in its extreme position at the outer portion of the V groove formed by the cone section 24 being thrust toward the fixed pulley face 14. In this position it will be noted that the locking pin 34 is displaced from engagement within the bore 31 and is riding upon the outer surface of the inner cone section 23 while the inner cone section 23 is thrust toward the fixed pulley face to its maximum position under the urge of the springs 21 and 27.

As the effective diameter of the driven pulley is reduced, the thrust imposed upon the movable portion 24 continues to move this section along the supporting shaft until there is a return to the position as illustrated in Figure 2 under which conditions the locking pin 34 drops into the bore 31 to cooperate with the pin 30 in holding the two cone sections 23 and 24 in face alignment.

Figure 4:
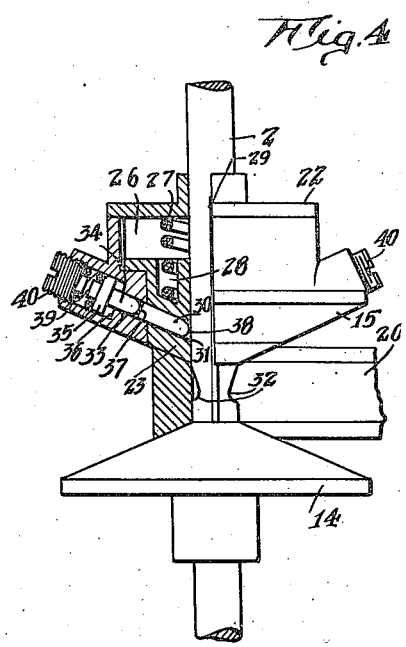
Figure 4 is a view similar to Figure 2 with the movable pulley face moved to a position of minimum effective diameter.

As the effective diameter of the driven pulley is further increased, the effective diameter of the driven pulley decreases due to the thrust imposed by the belt against the inclined surface of the inner conical section 23 with the result that the cam surface 38 of the pin 30 travels up the inclined surface of the recess 32 to where the inner end surface 38 of the pin 30 is supported upon the spline 29 or the surface of the shaft. This condition is illustrated in Figure 4 where the inner surface of the V-belt 20 is illustrated as riding substantially upon the surface of the supporting shaft.

It will be apparent from the foregoing that I have provided a variable speed V-belt pulley transmission drive which permits of a maximum variation of ratio between the driven and the driving pulley so that the belt may accommodate itself from the maximum effective diameter of the pulley substantially to the axis of the supporting shaft and that in each position the locking means 25 functions to retain the two cone sections 23 and 24 in their desired position so that there is never any liability of the V-belt pulley 20 having to ride over a misaligned surface between the two sections 23 and 24 of the movable face of the V-pulleys.

Having fully described my invention, it is to be understood that I do not wish to be limited to the details herein set forth, but my invention is of the full scope of the appended claims.

I claim:

1. In a V-belt variable speed transmission device, the combination of a driven shaft, a driving shaft, means for rotatably supporting such shafts in parallel relation, a variable effective diameter V-belt pulley mounted on each of said shafts, a V-belt connecting said pulleys and each of said pulleys including a movable face element and a fixed face element, each of the movable face elements comprising an inner cone section and an outer cone section, means for yieldably urging the said cone sections together toward the fixed face element, the inner cone section being yieldably movable but non-rotatable with reference to the outer cone section, a locking means for releasably locking the inner cone section in position upon the supporting shaft and for releasably locking the inner movable cone section with relation to the outer movable cone section, said locking means including a locking pin mounted in an inclined bore formed through the inner cone section, a second locking pin mounted in an aligned bore in the outer cone section, and yieldable means acting to urge both locking pins toward locking position.

2. In a V-belt variable speed transmission device, the combination of a driven shaft, a driving shaft, means for rotatably supporting such shafts in parallel relation, a variable effective diameter V-belt pulley mounted on each of said shafts, a V-belt connecting said pulleys and each of said pulleys including a movable face element and a fixed face element, each of the movable face elements comprising an inner cone section and an outer cone section, means for yieldably urging the said cone sections together toward the fixed face element, the inner cone section being yieldably movable but non-rotatable with reference to the outer cone section, a locking means for releasably locking the inner cone section in position upon the supporting shaft and for releasably locking the inner movable cone section with relation to the outer movable cone section, said locking means including a locking pin slidably mounted in an inclined bore formed through the inner cone section, said locking pin being movable axially of the bore for selectively locking the inner cone section to either the outer cone section or to the shaft.

3. In a V-belt variable speed transmission, the combination of a pair of parallel shafts, V pulleys mounted upon the shafts, a V-belt trained between the pulleys, each of said pulleys including a movable pulley face comprising an inner and an outer cone section, and a locking means for holding the said cone sections with relation to each other and with relation to the supporting shaft, said locking means including a locking pin mounted in the bore of the inner cone section and adapted to project into a locking recess below the cone section, and a second locking pin carried by the outer cone section and adapted to engage the lower pin to hold the cone sections in face alignment.

4. In a V-belt variable speed transmission device, the combination including a pair of shafts, a pair of V-belt pulleys mounted upon the shafts, and each of said pulleys having a movable inclined pulley face and a fixed inclined pulley face, the movable pulley faces comprising inner and outer cone sections relatively movable with relation to the fixed face and with relation to each other, means for yieldably urging the movable pulley face toward the fixed pulley face, and a locking means for yieldably locking the movable pulley face sections with relation to each other and with relation to their corresponding fixed pulley face, said locking means including a locking pin mounted in the inner pulley face section adapted to engage a locking recess therebelow to limit the movement of the inner movable pulley section away from the fixed pulley face, a lock pin bore formed in the outer pulley section adapted to align with the said lock pin when the two pulley sections are in pulley face alignment permitting the locking pin to travel out of the locking recess and into the outer movable pulley section bore so that the said pulley sections may move together away from the fixed pulley face.

5. In a V-belt variable speed transmission, the combination of a pair of parallel shafts, V-belt pulleys upon the shafts, a V-belt trained between the pulleys, each of said pulleys including a movable pulley face comprising inner and outer cone sections, and a locking means for holding the cone sections with relation to each other, and with relation to the supporting shaft, said locking means including a locking element mounted in the bore of the inner cone section and adapted to cooperate with locking means below the cone section, and a second locking means carried by the outer cone section and adapted to operatively engage the lower cone locking means to maintain the said cone sections in face alignment.

6. In a V-belt variable speed transmission, a V-belt pulley having inner and outer pulley faces relatively movable with relation to each other, one of said pulley faces having inner and outer relatively movable face sections, means for yieldably urging one of the pulley faces toward the other, and a locking means for yieldably locking the latter said pulley face with relation to the other pulley face, said locking means including a locking element mounted in the inner section of the said pulley face adapted to engage in a locking recess to limit the movement of the said inner movable pulley section away from the other pulley face, a second locking means formed in the outer pulley section adapted to align with the first said locking means when the two pulley sections are in pulley face alignment whereby the said pulley face sections are locked together.

7. In a variable speed transmission, the combination of a shaft, a V-belt pulley on the shaft having an axially movable belt-engaging member, said member having inner and outer relatively movable cone sections, locking means including a pin slidably mounted in the inner cone section and adapted to selectively engage either the outer cone section or the shaft, and resilient means acting to move the pin toward locking position with said shaft.

8. In a variable speed transmission, the combination of a shaft, a V-belt pulley on the shaft having an axially movable belt-engaging member, said member having inner and outer relatively movable cone sections, locking means including a pin slidably mounted in the inner cone section and adapted to selectively engage either the outer cone section or the shaft, resilient means acting to move the pin toward locking position with said shaft, and means for moving the inner cone section axially of the shaft.

FRANCIS G. COSTELLO.

REFERENCES CITED

The following references are of record in the file of this patent:

UNITED STATES PATENTS

| Number | Name | Date |
| --- | --- | --- |
| 1,993,131 | Borgna | Mar. 5, 1935 |
| 2,136,437 | Hollestelle | Nov. 5, 1938 |
| 2,257,744 | Heyer | Oct. 7, 1941 |
| 2,198,314 | Morella | Apr. 23, 1940 |

FOREIGN PATENTS

| Number | Country | Date |
| --- | --- | --- |
| 358,404 | French | Feb. 15, 1906 |